Feb. 13, 1968
J. H. TROLL
3,369,106
PROCESS-HEATING CONTROL SYSTEM
Filed July 27, 1965
2 Sheets-Sheet 1
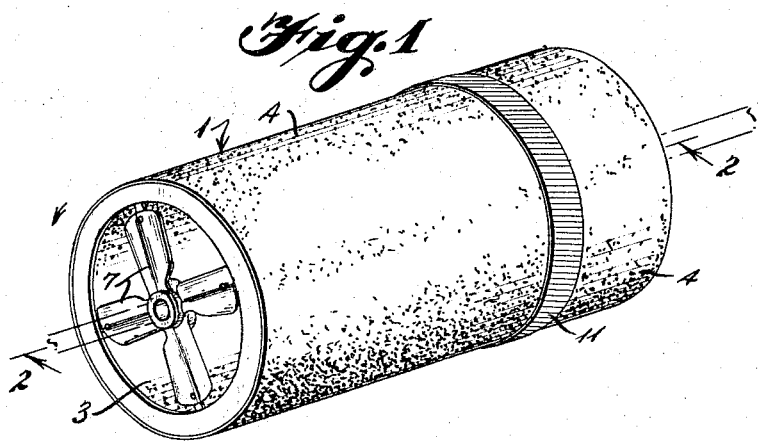
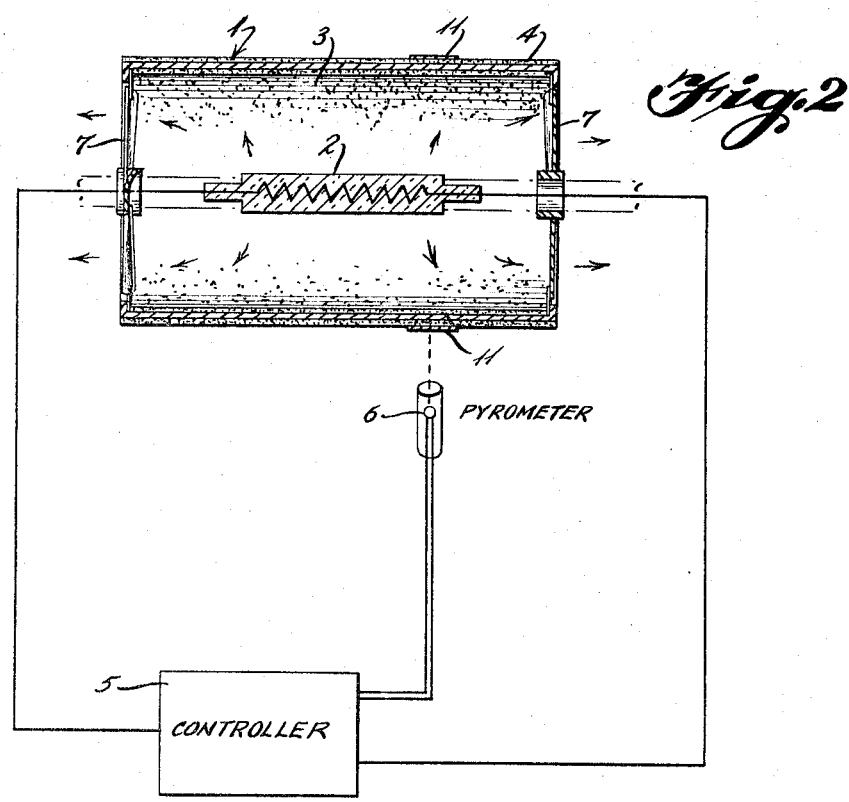

United States Patent Office 3,369,106
Patented Feb. 13, 1968

3,369,106
PROCESS-HEATING CONTROL SYSTEM
John H. Troll, Bronx, N.Y., assignor to Pyrotel Corp., Mamaroneck, N.Y., a corporation of New York
Filed July 27, 1965, Ser. No. 475,206
6 Claims. (Cl. 219—471)

ABSTRACT OF THE DISCLOSURE

A process roll heating and control system in which a thin-wall hollow rotary process roll is radiantly heated by an infrared emitter positioned inside the roll. An infrared detector sighted on the outside surface of the roll senses roll temperature and a control means associated with the detector controls the infrared emitter heating element in accord with the sensed temperature to maintain the desired roll temperature. The system exhibits a rapid response to temperature transients, and maintains desired roll temperature with a high degree of accuracy.

---

Figure 3:
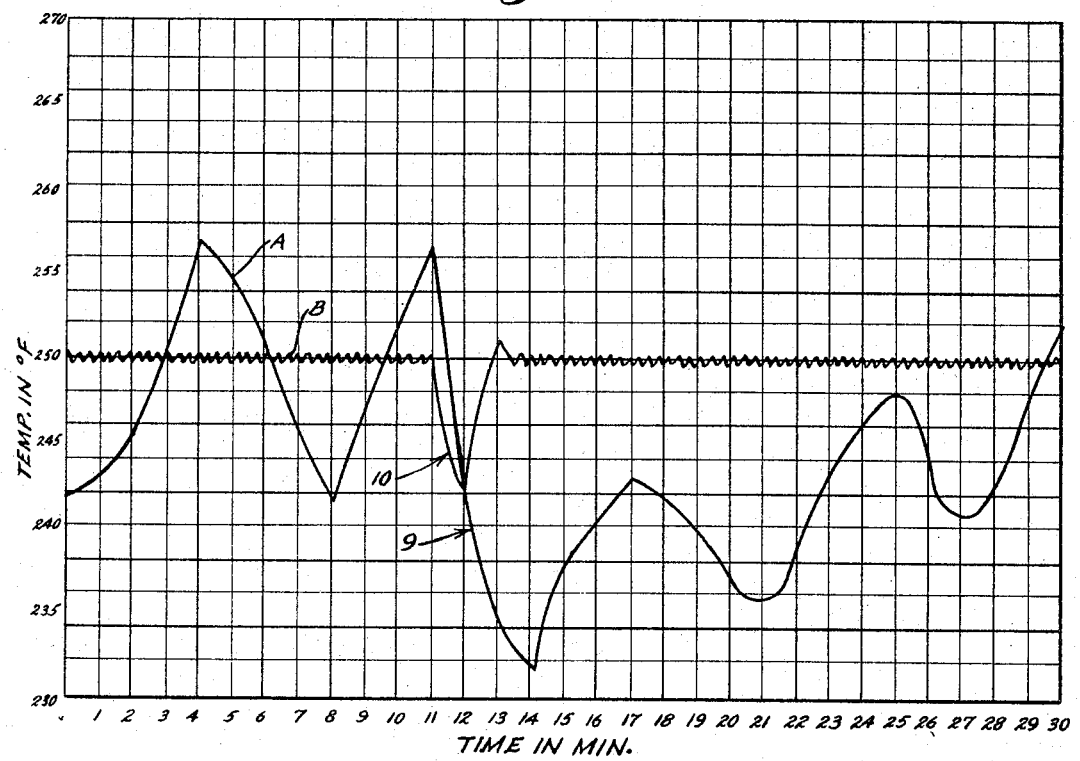

The present invention relates to an arrangement for controlling the heating of process rolls of the type customarily employed in the manufacture of synthetic fibers, paper, plastic sheets, rubber compositions, and the like.

The problems involved in attaining accurate heating control of heated process rolls are well-known to the art. First and foremost is the need to heat the roll in such manner that the material treated thereon is heated to the desired degree. A common difficulty is that the roll ends, where thermal losses are the greatest, do not heat the marginal edges of the material treated thereon to the desired temperature level; for some applications, only a small central portion of the roll can be utilized.

On occasion, a specific profile of heat distribution axially of the roll is required so that manifold wraps of a filamentary material on the roll can be subjected to differential temperature treatment. Conventional systems cannot achieve an even temperature distribution over the face of the roll so that a controlled temperature profile is beyond their reach.

A further difficulty with conventional systems involves control of the surface temperature level and concomitantly the maintenance of desired heat transfer. This difficulty is at times exacerbated by sudden changes in ambient temperature conditions and other transient phenomena. The roll has a substantial heat capacity acting as a heat sink so that raising or lowering the roll temperature involves substantial time lags, even if the heating system were equipped with accurate sensing devices and automatic sensing controls.

Still another problem involves the method used for sensing the temperature which is to be controlled. The only accurate place at which the temperature should be measured is the roll which is in contact with the material. This surface, however, rotates making contact with thermocouples, a conventional method of making these temperature measurements, difficult. It is therefore normal practice to locate thermocouples at some location other than the rotating surface resulting often in gross error of measurement and control. An alternative technique is to locate the thermocouple at the roll surface and feed the information out via slip rings, thereby eliminating one source of error but adding what may be an even larger source of error due to slip ring noise. Yet, another method of controlled heating utilizes special heating liquids on the inside of the roll whose temperature is controlled in some central distributing station. This method is also subject to inaccuracies due to local ambient temperature changes and process variations at the roll surface, and in addition requires costly pumping and hydraulic installations.

The object of the present invention is to provide a heating and control system for a processing roll structure wherein the temperature level of the roll surface is quickly and accurately controlled by sensing elements not in physical contact with the roll.

A further object of the invention is to achieve such heating control on the basis of the roll surface temperature alone.

Yet a further object of the invention is to provide a heating control system which eliminates long waiting time periods to bring the process rolls up to temperature and within control operation.

Another object of the invention is to provide a system which will maintain the desired control temperature in the presence of large ambient temperature changes or other transient conditions and will maintain such control without the temperature overshoots experienced in conventional control systems.

Still another object of the invention is to provide a control system which, because of the rapidity of its response and the concentration of heat at its surface, will reduce the amount of heating power required in these applications substantially.

A further object of this invention is to provide a heated roll system wherein the temperature of the roll may have a pre-determined axial temperature profile.

Additional objects and advantages of the present invention will be apparent from the more detailed description which follows.

Figure 4:
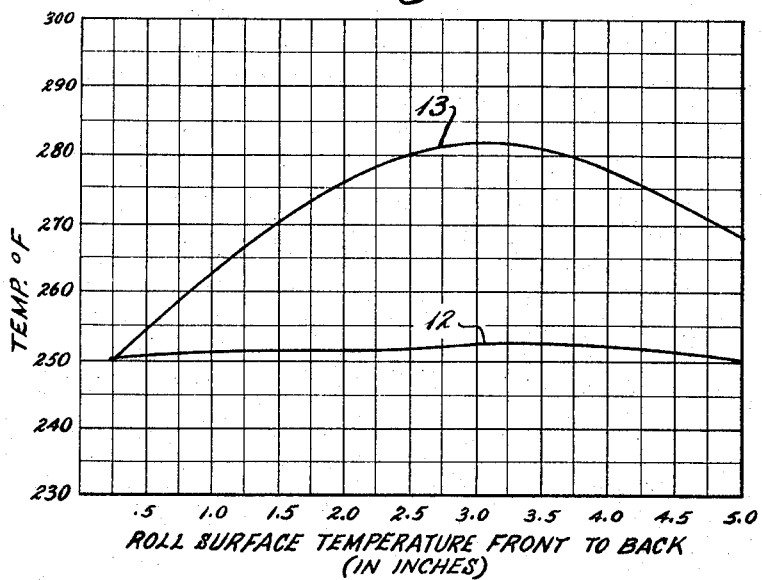

Referring now to the attached drawing wherein:
FIGURE 1 diagrammatically illustrates a hollow process roll;
FIGURE 2 is a section taken along line 2—2 of FIGURE 1 and illustrates the relationship of the process roll to the heating control system;
FIGURE 3 is a time-temperature chart of the present system and of a prior art system; and
FIGURE 4 is a profile of the surface temperatures axially of two process rolls.

Briefly characterized, the system employed in the present invention as shown in the drawing consists of a thin wall, hollow roll 1 heated by an axially disposed elongated radiant heating element 2 from which relatively narrow wavelength infrared radiation is emitted. The internal surface of the roll impinged by the radiation is coated with a material 3 selected to absorb the emitted radiation to a desired extent and conduct the absorbed radiant energy to the roll 1. In addition roll 1 has an outside surface 4 which is coated or treated so as to approximate the conditions of a black body radiator. If desired, only a circumferential black stripe 11 may be placed on roll 1. The temperature of the heated roll is measured by an infrared detector system 6 sighting on stripe 11 which concentrates and filters the infrared radiation emitted by the outer surface 4 of the roll 1 on to a detector element therein, which in turn translates the radiation into an electrical signal sent by the amplifier-controller 5. The controller 5 thus transmits a signal to the heating element 2 as a function of the temperature requirements read at the surface of the roll 1. The roll 1 may be made of any temperature conductive material with the proper structural characteristics for the process of which the roll system is a part, e.g., aluminum. The heating element 2 may be, for example, a quartz tube with a tungsten filament, a ceramic heater, or any spectrally controllable infrared radiant heating device. The pyrometer 6 may be any rapidly responding thermistor, bolometer, photoconductive or photovoltaic detector with sufficient sensitivity. In practice, Pyrotel PY150 and 60 pyrometers have been satisfactory. The amplifier-controller 5 may be any suitable amplifier-controller system and may use on/off or proportional control outputs. In practice, Pyrotel PY61 and PY151 units have been satisfactory.

Only a brief description has been given of the component elements forming the present system because such elements as infrared heaters, pyrometers, and controller-amplifiers are well known to workers in the art and are commercially available.

In a preferred system, the radiating energy emitted by the heating element 2 will peak between 3.5 and 4.2 microns since the radiation in this spectral region will result in a minimum absorption of the heat in the air space between the heater element 2 and the inner coating 3 of roll 1. An optional improvement for control of the air space temperature is the mounting of an impeller blade 7, best shown in FIGURE 1, at the end of the roll 1 for the purpose of changing the air within the roll 1 continually and thereby further reduce any effects this air space may have on the heating of the roll 1.

FIGURE 3 is a graph showing the improvement in performance obtained with one embodiment of the present invention compared with the performance of a typical prior art roll heating control system. Curves A and B plot a temperature in °F. on the vertical axis vs. time in minutes on the horizontal axis. The temperature for all curves was measured by a Pyrotel PY150 radiation pyrometer (lead sulfide detector) viewing the center of the roll outer surface.

Curve A shows experimental results obtained with a conventional roll control system heated by resistance heating elements of 500 watt capactiy, where the elements are arranged in the form of a clam shell in close proximity to the interior surface of the roll. The heat is controlled by a thermocouple mounted on the aluminum heater supports. The system is believed to represent the best of several conventional roll control systems investigated.

As can be seen from curve A, the control cycle duration was about 8 minutes and the control tolerance for this system was −8° and +7° from the nominal control temperature of 250° (a control span of 15°) after completion of a warm-up period, which required 1½ hours. The curve also shows at 9 the response of the prior art control system to a temperature transient, which was a one-minute blast of cold air directed at the roll surface from a distance of one foot. The prior art control system response was a drop to a temperature of 232° (18° below the nominal control point of 250°); it required an interval of 31 minutes for the system to regain control around the control point.

Curve B represents the results obtained with a heating control system representing one embodiment of the invention. The system used a hollow roll of cast aluminum (6061 T6 series) coated on the outside with Alumina ($Al_2O_3$) (0.002" hardness of rock roll 7); black anodized on the interior roll surface and painted on selective bands with high temperature reflective point (aluminum pigment) for controlling axial temperature distribution. The heating system used was a tungsten filament, iodine cycle, 250 watt source, enclosed in a quartz envelope (rear lamp surface coated with 95% Ag 5% Pd reflective coating), producing infrared radiation peaking in the 2.5 to 3 micron region. The roll surface was controlled by a Pyrotel PY151 radiation control system using a single mercury relay on/off control. It can be seen from the curve B that the control cycle duration was about 0.25 minute and the control tolerance, after a warm-up period which was ten minutes, was 0.25°. At 10 is shown the response of the new system to the same temperature transients used on the prior art system, i.e., a one minute blast of cold air at one foot from the surface. At the end of the blast, the roll temperature dropped to 244° (6° below the nominal control value of 250°); full control to within 0.25° of the nominal control was reached within one minute with a maximum overshoot of 1° over the control point.

FIGURE 4 compares the axial temperature distribution (thermal profile) of a prior art roll control system with that obtained in the present system. Curve 13 shows the temperature profile of the prior art system from the front to the back of the roll with a maximum deviation of +30° from the 250° control point. Curve 12 shows a temperature profile of the present system with a maximum deviation of +2.5°. As has already been indicated, temperature profiles can be tailor made by spacing of radiation sources and selection of infrared coating distribution.

A summary of the two systems is given below in Table 1.

TABLE 1

| Parameter | Prior Art Roll Heat Control | Present Roll Heat Control |
| --- | --- | --- |
| Heat up and stabilization time | 1½ hrs | 10 minutes. |
| Control cycle | 8 minutes | 0.25 minutes. |
| Control cycle tolerance | −8° F.+7° F. (15° span) | ±0.25° F. (0.5° span). |
| Thermal rise across roll | 32.5° F | 2.2° F. |
| Power consumption | 500 w./hr | 250 w./hr. |
| Transient effect (air blast at 12" for 60 seconds) | −18° F | −6° F. |
| Transient recovery time | 31 minutes | 1 minute. |

What is claimed is:

1. A temperature controlled heated roll system comprising a rotatable hollow process roll; an infrared emitting heating element disposed internally of the process roll; an infrared absorptive coating on the internal surface of the process roll; an infrared detector sensing element positioned outside of the process roll and sighting on the outer surface thereof, sensing the process roll temperature through the emissions therefrom; and a control means connected to said detector and to said infrared emitting element for controlling the emissions from the emitting element in accord with the sensed temperature reading of said detector.

2. The apparatus of claim 1 including an impeller blade mounted on said roll to draw air through the roll axially, whereby the capacitive thermal lag of heated air internally of the roll is effectively removed by circulation of air through the hollow roll.

3. The apparatus of caim 1 including a black stripe on the external roll surface said detector sighting on the black stripe.

4. The apparatus of claim 1 wherein the external surface of the roll has thereon a coating having high infrared emissivity.

5. The apparatus of claim 1 wherein the internal coating has variable infrared absorptivity axially of the roll.

6. A temperature controlled heated process roll system comprising a hollow thin wall process roll formed of high thermal conductivity material; an infrared absorptive coating on the internal surface of said drum; an elongated infrared emissive heating element inside said roll; an infrared emissive coating selectively coated on the outer roll surface; an infrared radiation sensor sighting on the coating on the outer roll surface for sensing the temperature level thereof; and control means connected to said sensor and to said heating element for controlling the heating element in accordance with the sensed roll temperature.

References Cited

UNITED STATES PATENTS

| | | | |
| --- | --- | --- | --- |
| 1,514,288 | 11/1924 | Hynes | 219—471 X |
| 2,152,934 | 4/1939 | Trent | 219—540 |
| 2,162,098 | 6/1939 | McCabe | 200—138 |
| 2,187,613 | 1/1940 | Nichols | 219—502 X |

RICHARD M. WOOD, *Primary Examiner.*

L. H. BENDER, *Assistant Examiner.*